United States Patent [19]

Lim

[11] 3,899,343

[45] Aug. 12, 1975

[54] BRIGHTNESS OF CRYSTALLINE LAYERED SILICATE MINERALS

[75] Inventor: John C. Lim, Somerville, N.J.

[73] Assignee: Engelhard Minerals & Chemicals Corporation, Edison, N.J.

[22] Filed: Feb. 26, 1973

[21] Appl. No.: 335,471

[52] U.S. Cl. .............................. 106/72; 106/288 B
[51] Int. Cl. ......................... C09c 1/42; C08h 17/06
[58] Field of Search... 106/72, 288 B, 308 N, 308 Q

[56] References Cited
UNITED STATES PATENTS

| | | | |
|---|---|---|---|
| 3,193,344 | 7/1965 | Iannicelli et al. | 106/72 |
| 3,309,211 | 3/1967 | Weiss et al. | 106/72 |
| 3,320,027 | 5/1967 | Maynard et al. | 106/72 |
| 3,520,719 | 7/1970 | Horton | 106/72 |
| 3,567,474 | 3/1971 | Malden | 106/72 |
| 3,666,513 | 5/1972 | Malden | 106/72 |

*Primary Examiner*—Winston A. Douglas
*Assistant Examiner*—J. V. Howard
*Attorney, Agent, or Firm*—Melvin C. Flint; Inez L. Moselle

[57] ABSTRACT

A process for improving the brightness of an iron-contaminated layered lattice hydrated crystalline silicate material such as kaolin clay by intercalating the clay with a lower dialkylsulfoxide such as dimethylsulfoxide to form an expanded lattice mineral structure, followed by forming a soluble iron coordination compound with an iron-complexing ligand such as ammonium thiocyanate which is soluble in the dialkylsulfoxide, subsequently removing the complexed iron from the particles of the silicate mineral and washing the particles with water to displace and replace intercalated molecules of dialkylsulfoxide with water.

3 Claims, No Drawings

3,899,343

BRIGHTNESS OF CRYSTALLINE LAYERED SILICATE MINERALS

BACKGROUND OF THE INVENTION

Naturally-occurring hydrated silicate minerals having layered lattice crystalline structures are exemplified by kaolinite, dickite, nacrite and halloysite. Originally the layers of such minerals are separated by lattice-held water. This distance, characteristic of the particular mineral species, is about 7.1 Angstrom units in the case of Kaolinite, the predominating mineral species of most kaolin clays.

Impurities contained within the layers of the crystal structures of such minerals are substantially unaffected by either conventional aqueous mineral bleach treatments or by leaching treatments which are sufficiently mild to preclude destruction of the crystal structure. Iron proxying for aluminum in the crystal structure is also unaffected. Consequently, a kaolin clay pigment which has been either extensively bleached with a hydrosulfite salt or which has been exhaustively leached with acid and/or alkali may still contain a small but measurable amount of residual ferruginous impurity. This aqueous bleaching or leaching acts upon superficial iron impurities but the reagents used cannot penetrate within the crystal structure without destroying the crystalline lattice.

High brightness and whiteness is an essential property of silicate minerals intended for pigment or extender use in fields such as paper coating. Even small amounts of ferruginous compounds, especially ferric compounds, have a detrimental effect upon the brightness of silicate mineral materials such as kaolin clays. Removal of even trace amounts of iron impurities from clay is of considerable practical importance if such removal is associated with a perceptible brightening of the clay. For example, a kaolin clay pigment is improved to a commercially significant extent by increasing the brightness by as little as one point on the conventionally used brightness scale (determined by a TAPPI method hereinafter described).

It is an object of the present invention to provide a process for improving the brightness of layered lattice crystalline silicate minerals which are discolored as a result of the presence of one or more iron compounds, especially ferric compounds, which are not eliminated from the clay by conventional bleach reagents.

A specific object is to provide a process for brightening such minerals which results in removing interlayer iron compounds.

PRIOR ART

It is known (U.S. Pat. No. 3,309,211 to Weiss et al. and U.S. Pat. No. 3,520,719 to Horton) that the crystal lattice structure of silicate minerals such as kaolinite can be expanded by reacting the clay with certain chemical compounds which produce clay intercalation products. Intercalating compounds are exemplified by acetamide, urea and dimethylsulfoxide. A distinguishing characteristic of the X-ray diffraction pattern of the dimethylsulfoxide Kaolinite intercalation compound is a maximum at $8.0° 2\theta$, corresponding to an expanded $d$ spacing of about 11.05 Angstrom units.

The disclosures of the patents to Horton and Weiss et al. mention the fact that the clay lattice of an intercalation compound can be restored to nonexpanded condition by displacing and replacing molecules of the intercalated compound with molecules of water, thereby forming a regenerated clay material which is chemically the same as the original hydrated silicate and is only slightly changed in crystal habit.

In an embodiment of the procedure described in the Weiss et al. patent, the chemical compound which is used to form the intercalation produce is employed as a "carrier" for an additional compound which at least partially displaces and replaces previously incorporated molecules of the carrier substances. By way of example, displacement of intercalated ammonium acetate by saturated aliphatic amines or ethylenediamine is illustrated. The patent briefly alludes to the possibility of incorporating an additional substance into the clay in a single step by dissolving the added compound in the intercalating compound. The same patent, in another portion of the specification, includes a statement to the effect that dimethylsulfoxide can be displaced and replaced from dimethylsulfoxide-kaolinite with an additive substance normally not capable of penetrating between the kaolinite layers. Neither possibility is further described or exemplified.

Intercalation has also been proposed as a method for removing ferric ions from clay, allegedly removing ferric ions substituted for aluminum ions in the crystal lattice. Reference is made to U.S. Pat. No. 3,567,474 and U.S. Pat. No. 3,666,513 to Malden. According to the teachings of U.S. Pat. No. 3,567,474, clay such as kaolin is reacted with a compound such as urea to form an intercalation compound and thereafter the intercalation compound is treated with an oxidizing agent. In carrying out the technique described in U.S. Pat. No. 3,666,513, the intercalation complex formed by reacting a layered silicate mineral with urea, formamide, hydrazine or acetamide is bleached with a reducing agent capable of reducing ferric ions to ferrous ions and the complex is then decomposed under nonoxidizing conditions. When hydrazine is employed it may also serve as the reducing agent.

U.S. Pat. No. 3,193,344 to Iannicelli et al describes a process for bleaching clay wherein an aqueous slurry of the clay is treated with a reducing agent capable of reducing ferric iron to ferrous iron and a watersoluble agent capable of complexing ferrous ions (e.g., mercaptoacetic acid or thiomalic acid). The clay is separated from the aqueous solution of complexed iron. The Iannicelli et al technique does not involve the formation of an intercalation compound.

Thus, some of the prior art includes a recognition of the possibility of expanding the lattice of clay before bleaching in aqueous media and other prior art utilizes iron complexation as a means for bleaching. To the best of my knowledge, the prior art fails to recognize the possibility of utilizing, in combination, the concepts of intercalation and iron complexation.

THE INVENTION

In accordance with the present invention, particles of a layered lattice crystalline hydrated silicate mineral containing an iron impurity are bleached by forming a silicate mineral-lower dialkylsulfoxide intercalation compound, reacting iron impurities associated with said intercalated silicate mineral with an iron-complexing ligand which is soluble in the dialkylsulfoxide to form a colored iron coordination compound which is also soluble in the dialkylsulfoxide, separating the iron coordination compound from the particles of intercalated silicate mineral and regenerating the original hydrated silicate structure by displacing and replacing molecules of the previously intercalated dialkylsulfoxide with water.

In a preferred embodiment of the invention, the mineral to be bleached is mixed with a dilute solution of the ligand in a lower dialkylsulfoxide using a substantial excess of the dialkylsulfoxide over the amount theoretically required to intercalate all of the silicate mineral particles, whereby the iron coordination complex dissolves in unreacted dialkylsulfoxide after it is formed and it is removed by separating the sulfoxide intercalated silicate mineral product from a solution of complexed iron. Following such treatment, the molecules of intercalated dialkylsulfoxide are displaced by an replaced with water molecules.

The process of the invention has resulted in a significant improvement in the brightness of clay which had previously been bleached with a hydrosulfite salt at an acidic pH, in accordance with conventional practice by the clay industry processors. The process of the invention has also resulted in perceptible removal of ferric iron from a refined clay which had been exhaustively leached sequentially with an acid and a base, both in aqueous solution, without destroying the crystal structure of the clay. The marked improvement in brightness which resulted when previously bleached clay was treated was wholly unexpected because the amount of iron which was removed by my treatment was extremely small.

The fact that my bleached clay still contained a significant amount of residual iron and that superficial iron stain had previously been removed by a dithionite bleach leads to the conclusion that interlayer iron was removed by carrying out the process of the invention. It is postulated that interlayer iron compounds are present as ferric oxides and/or silicates.

From this brief description of my invention it is apparent that my bleaching method differs fundamentally from prior art bleaching methods involving the formation of intercalated layered silicate mineral complexes. In the prior art techniques, the compound capable of entering between the layers of the crystal structure functioned to provide access for conventional bleaching reagents. In my process, the intercalating compound functions to introduce or carry a compound which forms a soluble iron complex which is then removed from the mineral structure. My technique also represents a basic departure from the prior art "carrier" technique. Thus, the material carried by the intercalating agent in my process is used to react with a constituent in the mineral. Such reaction product is subsequently removed from the mineral in the process. In the prior art technique, in marked contrast, the material carried by an intercalation agent displaces and replaces the carrier, remaining with the mineral to modify its properties.

DESCRIPTION OF THE PREFERRED EMBODIMENTS

Iron contaminated naturally-occurring clays composed predominently of layered lattice crystalline hydrated silicate minerals may be used in carrying out my invention. Such minerals include kaolinite, nacrite, dickite, halloysite and montmorillonite. The minerals may be present with the usual accessory clay minerals such as calcite, quartz and micas.

The principal benefit of my process results from the removal of iron impurities which are not removed by conventional aqueous bleaching or leaching reagents. Thus, the process is applicable to the treatment of previously bleached and/or leached clay materials. However, my process may also be used with unbleached or unleached clays since superficial stain and discrete ferruginous impurities will also be removed by the complexation reaction.

The process is especially beneficial when the iron impurity is present in ferric ($Fe^{+3}$) state since the ferric coordination complexes formed in carrying out the invention are generally more strongly associated (more stable) than corresponding ferrous complexes.

Clays containing very low levels of iron, e.g., clays analyzing 0.005% to 0.5% $Fe_2O_3$, may be treated. Clays containing higher levels of iron may be employed. Appreciable residual iron may remain with the clay after carrying out the process of the invention. Such residual clay is an integral part of the clay lattice.

Examples of complexing agents which are soluble in lower dialkylsulfoxides include the following: alkali metal thiocyanate, ammonium thiocyanate, acetylacetone, O-phenantroline, bipyridine, ethylenediamine, mercaptoacetic acid, thiomalic acid and mercaptoethanol. Mixtures of two or more of the aforementioned complexing agents may be used. All of these compounds form characteristically colored complexes with ferric ions. Several also produce such complexes with ferrous ions.

The lower alkyl sulfoxides used in carrying out the invention are normally liquids and include dimethylsulfoxide, diethylsulfoxide and dipropylsulfoxide. Of these, dimethylsulfoxide is preferred because of its availability. Excellent results were realized when water-free dialkylsulfoxide was used with dry clay. It has been reported, however, that 90% intercalation of dimethylsulfoxide between the layers of kaolinite takes place when a dimethylsulfoxide solution containing 10% water and 1% kaolinite is maintained at ambient temperature. Consequently, it is expected that water-dialkylsulfoxide solutions of various concentrations may be employed provided sufficient dialkylsulfoxide is present in the aqueous mixture at a sufficient concentration to form the desired intercalation compound.

The dialkylsulfoxide must be present in amount of at least one mole per equivalent of silicate mineral, e.g., at least about 30% dimethylsulfoxide based on the dry weight of kaolin clay. An equimolal mixture usually has a plastic consistency. Preferably, a fluid mixture is formed by using a substantial excess of dialkylsulfoxide.

The iron complexing agent may be dissolved in the dialkylsulfoxide before mixing the dialkylsulfoxide with the clay to be bleached or the complexing agent may be added alone or dissolved in dialkylsulfoxide to a previously formed mixture of clay and dialkylsulfoxide. Thus the complexing agent may be added to a previously reacted (intercalated) clay-dialkylsulfoxide compound.

During reaction the mixture may be subjected to shearing action, as described in U.S. Pat. No. 3,309,211 in order to delaminate the clay crystals.

My process may be carried out at pH conditions ranging from acidic to mildly alkaline. Obviously strongly alkaline conditions should be avoided in order to prevent formation of insoluble hydrated iron oxides.

The solution of complexing agent should be thoroughly mixed with the particles of the mineral to be bleached.

Conventional conditions for forming dialkylsulfoxide intercalation complexes may be used. Reference is made to U.S. Pat. No. 3,520,719 and U.S. Pat. No. 3,309,211 (supra). The system should be maintained under conditions favorable for forming a dialkylsulfoxide intercalation product until reaction between the iron impurity in the clay and the complexing agent is completed. Reference is made to U.S. Pat. No. 3,520,719 as to criteria for establishing the formation of dimethylsulfoxide-kaolinite.

Since iron ($Fe^{+3}$) coordination compounds are colored, completion of reaction between the iron ligand carried by the sulfoxide and iron impurities in the clay may be readily determined by following color changes in the system. After reaction is complete or substantially complete, the liquid phase may be separated from the solids by any suitable means such as decantation, filtration or centrifugation when sufficient sulfoxide is used to form a fluid reaction mixture. The solids are then preferably washed with fresh dialkylsulfoxide to remove residual iron complex from the mineral particles. The cleaned particles are treated with water, as described for example in U.S. Pat. No. 3,520,719, to displace the dialkylsulfoxide from the layers of the crystal structure and replace the sulfoxide molecules with water molecules. When this reaction is carried out with insufficient dialkylsulfoxide solution to form a separate liquid phase, more solvent for the complex may be required to remove adherent complexed iron than when a separate liquid phase is maintained.

The following examples are given for illustrative purposes and are not to be considered as limiting the invention to the specific reaction conditions and reagents which are utilized.

In these examples all brightness values were obtained with an ELREPHO brightness meter, using TAPPI standard method T-646 m-54. Reflectance to light at 457 millimicrons wavelength was used in making brightness determinations.

EXAMPLE I

A commercial No. 2 coating grade of Georgia kaolin clay, "HI," was bleached by the method of the invention. The "HT" clay was composed predominantly of well crystallized kaolinite ($Al_2O_3 \cdot 2SiO_2 \cdot 2H_2O$). The clay had undergone previous refinement entailing degritting, particle size fractionation, bleaching with zinc hydrosulfite at an acidic pH to remove superficial iron, filtration and washing. The clay was a predispersed grade and had a pH of about 6.5. The starting clay had a brightness of 86.1 percent and analyzed 0.350 percent $Fe_2O_3$ (weight).

In accordance with this invention, 22.2 grams of the dry clay was thoroughly mixed in a glass container with 50.0 ml. of a 0.1 M solution of ammonium thiocyanate in dimethylsulfoxide. The container was tightly sealed and then placed in an oven maintained at 200°F. After 1½ hours, the container was removed. A distinct pink color, characteristic of an iron-thiocyanate complex, was observed. The contents of the container were allowed to cool to room temperature. The solids were separated from the liquid phase by filtration. The filter cake was then washed with 50.0 ml. of fresh dimethylsulfoxide to remove residual coordination complex from within the layers and from the surface of the crystals. This wash liquid was combined with the initial filtrate and the mixture was analyzed for iron. To displace dimethylsulfoxide from the layers of the kaolinite crystals and to restore the kaolinite structure, the cake was washed with 100.0 ml. of hot water. To facilitate drying, the cake was then washed with 50.0 ml. of acetone. The clay was allowed to air dry.

A chemical analysis of the dimethylsulfoxide solution used to carry the thiocyanate complexing agent indicated that the clay which originally analyzed 0.350 percent $Fe_2O_3$ contained 0.346 percent $Fe_2O_3$ after treatment. Tests carried out with the treated clay product indicated that the remaining iron could not be removed without destroying the crystal structure of the clay. Unexpectedly, the removal of such trace amount of iron (about 1.1 percent) was associated with a remarkable increase in brightness. Thus, the brightness of the clay after treatment was 87.4 percent — an increase in 1.3 brightness units over the starting brightness of 86.1 percent.

EXAMPLE II

In this example, residual iron in a Georgia kaolin clay from which superficial iron had previously been eliminated by repeated sequential extractions with sodium hydroxide solution and hydrochloric acid solution was bleached by intercalating kaolinite with dimethylsulfoxide and extracting residual traces of ferric iron by complexing it with acetylacetone.

A 0.1 M solution of acetylacetone (2,4 pentanedione) was prepared. Fifty ml. of the colorless solution (containing 0.055 g. acetylacetone) was mixed with 0.2 g. of dry leached clay. The resulting suspension was refluxed for 4 hours and allowed to cool. The suspension was filtered, producing a filtrate which exhibited the characteristic yellow color of ferric-acetylacetonate. Restoration of the kaolinite structure to the filter cake containing the purified clay could be accomplished by the procedure described in Example I.

EXAMPLE III

This example illustrates the use of ethylenediamine to remove residual iron in the leached kaolin clay of Example II.

One-half gram of the dry acid-base leached kaolin was mixed with 20 ml. of 0.1 M solution of ethylenediamine in dimethylsulfoxide. The suspension was refluxed for 4 hours and allowed to cool. A straw-yellow filtrate, indicative of the presence of ferric-ethylenediamine coordination complex, was obtained when the slurry was filtered. The filter cake was washed with hot water as in Example I. The filter cake exhibited the characteristic infra-red absorption peaks of kaolinite (3695, 3670, 3655, 3620 $cm^{-1}$). An X-ray diffraction pattern showed the original kaolinite peaks, modified by a reduced intensity of the 7 Angstrom peak, remained.

I claim:

1. A method for bleaching kaolin clay containing as an impurity a ferric compound which is not removed therefrom by a dithionite bleaching reagent which comprises forming a suspension of said clay with a dilute solution in dimethylsulfoxide of a complexing ligand selected from the group consisting of alkali metal thiocyanate, ammonium thiocyanate, acetylacetone, o-phenanthroline, bipyridine, ethylenediamine, mercaptoacetic acid, thiomalic acid, mercaptoethanol and mixtures thereof, said complexing agent being present in amount to react with said ferric compound in said clay to form a colored coordination complex and said dimethylsulfoxide being present in amount substantially in excess of 1 mole per equivalent of said clay and sufficient to maintain a liquid phase of dimethylsulfoxide after said reaction is completed, maintaining said suspension under conditions of time and temperature which favor formation of a kaolinite-dimethylsulfoxide intercalation compound until a colored coordination complex is formed by reaction between ferric ions in the impurity and said complexing ligand, separating the clay from a liquid phase, and washing the separated clay with water to decompose the kaolinitedimethylsulfoxide complex and restore the crystal structure to the clay.

2. The method of claim 1 including the step of washing the separated clay with dimethylsulfoxide to remove residual iron coordination complex before washing the clay with water.

3. The method of claim 1 wherein at least a portion of the ferric compound impurity is present between the layers of the clay mineral.

* * * * *

UNITED STATES PATENT AND TRADEMARK OFFICE
CERTIFICATE OF CORRECTION

PATENT NO. : 3,899,343
DATED : August 12, 1975
INVENTOR(S) : John C. Lim

It is certified that error appears in the above-identified patent and that said Letters Patent are hereby corrected as shown below:

Column 5 - line 45, "HI," should read -- "HT,".

Signed and Sealed this second Day of December 1975

[SEAL]

Attest:

RUTH C. MASON
Attesting Officer

C. MARSHALL DANN
Commissioner of Patents and Trademarks